United States Patent
Chen et al.

(10) Patent No.: US 11,467,338 B2
(45) Date of Patent: Oct. 11, 2022

(54) METHOD OF MAKING A DISTRIBUTED OPTICAL FIBER SENSOR HAVING ENHANCED RAYLEIGH SCATTERING AND ENHANCED TEMPERATURE STABILITY, AND MONITORING SYSTEMS EMPLOYING SAME

(71) Applicant: University of Pittsburgh—Of the Commonwealth System of Higher Education, Pittsburgh, PA (US)

(72) Inventors: Peng Kevin Chen, Pittsburgh, PA (US); Aidong Yan, Pittsburgh, PA (US); Michael P. Buric, Pittsburgh, PA (US); Paul R. Ohodnicki, Allison Park, PA (US); Sheng Huang, Pittsburgh, PA (US)

(73) Assignee: University of Pittsburgh-Of the Commonwealth System of Higher Education, Pittsburgh, PA (US)

( * ) Notice: Subject to any disclaimer, the term of this patent is extended or adjusted under 35 U.S.C. 154(b) by 200 days.

(21) Appl. No.: 16/807,232

(22) Filed: Mar. 3, 2020

(65) Prior Publication Data

US 2020/0200968 A1 Jun. 25, 2020

Related U.S. Application Data (62) Division of application No. 16/117,869, filed on Aug. 30, 2018, now Pat. No. 10,670,802.

(Continued)

(51) Int. Cl.
*G02B 6/02* (2006.01)
*H01M 8/04007* (2016.01)
(Continued)

(52) U.S. Cl.
CPC ..... *G02B 6/02204* (2013.01); *G01M 11/3172* (2013.01); *G01M 11/37* (2013.01);
(Continued)

(58) Field of Classification Search
CPC ............ G02B 6/02033; G02B 6/02147; G02B 6/0229; G02B 6/29319; G01N 21/49; G01M 11/3172; H01M 8/04067
See application file for complete search history.

(56) References Cited

U.S. PATENT DOCUMENTS

| 4,634,856 A | 1/1987 | Kirkham |
| 4,894,532 A | 1/1990 | Peterson et al. |

(Continued)

FOREIGN PATENT DOCUMENTS

EP 0120203 A1 1/1984

OTHER PUBLICATIONS

Nicholas L.P. Andrews, "Near-infrared absorption detection in picolitre liquid volumes using amplified fibre loop ring-down detection", Optical Fiber Technology 19 (2013), pp. 822-827, Elsevier Inc., www.elsevier.com/locate/yofte.

(Continued)

*Primary Examiner* — Thomas A Hollweg
*Assistant Examiner* — Mary A El-Shammaa
(74) *Attorney, Agent, or Firm* — Philip E. Levy; Eckert Seamans Cherin & Mellott, LLC (57) ABSTRACT

A method of making an optical fiber sensor device for distributed sensing includes generating a laser beam comprising a plurality of ultrafast pulses, and focusing the laser beam into a core of an optical fiber to form a nanograting structure within the core, wherein the nanograting structure includes a plurality of spaced nanograting elements each extending substantially parallel to a longitudinal axis of optical fiber. Also, an optical fiber sensor device for distrib- (Continued)

uted sensing includes an optical fiber having a longitudinal axis, a core, and a nanograting structure within the core, wherein the nanograting structure includes a plurality of spaced nanograting elements each extending substantially parallel to the longitudinal axis of the optical fiber. Also, a distributed sensing method and system and an energy production system that employs such an optical fiber sensor device.

21 Claims, 3 Drawing Sheets

Related U.S. Application Data (60) Provisional application No. 62/552,619, filed on Aug. 31, 2017.

(51) Int. Cl.
- *G01N 21/49* (2006.01)
- *G02B 6/293* (2006.01)
- *G01M 11/00* (2006.01)
- *H01M 8/12* (2016.01)

(52) U.S. Cl.
CPC ......... *G01N 21/49* (2013.01); *G02B 6/02033* (2013.01); *G02B 6/02147* (2013.01); *G02B 6/29317* (2013.01); *H01M 8/04067* (2013.01); *G02B 6/0229* (2013.01); *G02B 6/29319* (2013.01); *H01M 2008/1293* (2013.01)

(56) References Cited

U.S. PATENT DOCUMENTS

| | | | |
|---|---|---|---|
| 5,040,090 A | 8/1991 | Birkle et al. | |
| 5,319,975 A | 6/1994 | Pederson et al. | |
| 6,819,811 B1 | 11/2004 | Goldstein | |
| 6,952,436 B2 | 10/2005 | Wirnsberger et al. | |
| 7,037,554 B2 | 5/2006 | Tao et al. | |
| 7,092,160 B2 | 8/2006 | Putnam et al. | |
| 7,349,600 B2 | 3/2008 | Chen | |
| 7,376,307 B2 | 5/2008 | Singh et al. | |
| 7,792,392 B2 | 9/2010 | Chen et al. | |
| 7,842,243 B2 | 11/2010 | Sarkisov et al. | |
| 8,203,707 B2 | 6/2012 | Xu | |
| 8,338,799 B2 | 12/2012 | Monro et al. | |
| 8,503,839 B2 | 8/2013 | Cheben et al. | |
| 8,727,613 B2 | 5/2014 | Mihailov | |
| 10,054,863 B2 | 8/2018 | De Boer et al. | |
| 2002/0065366 A1 | 5/2002 | Wirnsberger et al. | |
| 2003/0059150 A1 | 3/2003 | Lyons | |
| 2004/0076391 A1 | 4/2004 | Ghoshal et al. | |
| 2004/0179765 A1 | 9/2004 | Kersey et al. | |
| 2005/0232532 A1 | 10/2005 | Wang et al. | |
| 2008/0179063 A1 | 7/2008 | Smith | |
| 2009/0289235 A1 | 11/2009 | Kniajanski et al. | |
| 2010/0119194 A1 | 5/2010 | Seigler et al. | |

OTHER PUBLICATIONS

George Stewart, "An investigation of an optical fibre amplifier loop for intra-cavity and ring-down cavity loss measurements", Measurement Science and Technology 12 (2001), pp. 843-849, Institute of Physics Publishing Ltd., Printed in the UK, www.iop.org/journals/mt.

Helen Waechter, "Chemical Sensing Using Fiber Cavity Ring-Down Spectroscopy", Sensors 2010, 10, pp. 1716-1742, www.mdpi.com/journal/sensors.

George Stewart, "Cavity-enhanced spectroscopy in fiber cavities", Optics Letters, Mar. 1, 2004, pp. 442-444, vol. 29, No. 5, Optical Society of America.

METHOD OF MAKING A DISTRIBUTED OPTICAL FIBER SENSOR HAVING ENHANCED RAYLEIGH SCATTERING AND ENHANCED TEMPERATURE STABILITY, AND MONITORING SYSTEMS EMPLOYING SAME

CROSS-REFERENCE TO RELATED APPLICATIONS

This application is a divisional application of U.S. patent application Ser. No. 16/117,869, filed on Aug. 30, 2018, entitled "Method of Making a Distributed Optical Fiber Sensor Having Enhanced Rayleigh Scattering and Enhanced Temperature Stability, and Monitoring Systems Employing Same," which claims priority under 35 U.S.C. § 119(e) from U.S. provisional patent application No. 62/552,619, entitled "Method of Making a Distributed Optical Fiber Sensor Having Enhanced Rayleigh Scattering and Enhanced Temperature Stability, and Monitoring Systems Employing Same" filed on Aug. 31, 2017, the contents of which are incorporated herein by reference.

GOVERNMENT CONTRACT

This invention was made with government support under grant #CMMI-1300273 awarded by the National Science Foundation (NSF), grant #DE-FE0028992 awarded by the Department of Energy (DOE), and grant #DE-NE0008686 awarded by the Department of Energy (DOE). The government has certain rights in the invention.

BACKGROUND OF THE INVENTION

1. Field of the Invention

The present invention relates to optical fiber sensor devices for making distributed sensing measurements (e.g., of temperature and/or chemical composition) in, for example, reactor systems, such as, without limitation, solid oxide fuel cell (SOFC) based power plant systems, and, in particular, to a method of making a distributed sensing optical fiber sensor device using ultrafast laser irradiation that has an enhanced Rayleigh scattering profile and enhanced temperature stability, and to improved monitoring systems that employ such enhanced distributed sensing optical fiber sensor devices.

2. Description of the Related Art

Solid oxide fuel cell (SOFC) technology is a promising and versatile energy conversion scheme. SOFCs are used in a wide variety of applications, ranging from clean automobiles to distributed electric power generation systems. SOFCs in stand-alone or hybrid generation configurations can utilize a wide array of gaseous fuels, from hydrogen to biogas, to achieve high energy conversation efficiencies and low emissions.

Modern SOFC systems exhibit high internal reaction temperatures, and are capable of internal gas-reforming to provide fuel flexibility and increased versatility. As a result, during normal use, a typical SOFC assembly will experience significant thermal stresses resulting from temperature variations that occur within the fuel assembly. In particular, significant temperature variations are produced within an SOFC assembly as a result of a number of different processes, including convection as gases with varying thermal conductivities flow through the SOFC assembly, conduction of heat through the supporting structure of the SOFC assembly, and heat generated by the distributed internal reforming or oxidation reactions that produce the electrical output. Over time, these temperature variations and the resulting thermal stresses cause material and/or structural degradation of the SOFC assembly. Such degradation negatively impacts the long-term stability of an SOFC system and ultimately negatively impacts the profitability of large-scale SOFC system deployment.

Thus, the ability to measure, understand and engineer the temperature distribution inside of an SOFC assembly is essential to improving the longevity of SOFC systems.

Currently, numerical simulations are used to estimate temperature distributions in SOFC systems because experimental measurements during operation have been extremely challenging. Thermocouple devices have been used by some researchers to perform single-point measurements. As many as thirty six thermocouples have been inserted in a fuel cell stack to perform multi-point measurements. However, each thermocouple requires two electrical wires for each point-measurement, and each wire introduces additional heat-losses which skews the accuracy of measurements. It is also physically impossible to place thermocouples in extremely close proximity to one another in order to produce high spatial-resolution measurements. Large numbers of wires in the SOFC assembly could also impede fuel gas-flow, which may further alter the temperature profile during measurement.

Distributed fiber optic sensing is a potentially powerful technique to measure the spatial temperature profile of an operating SOFC system. Being well-suited for harsh environment sensing applications, fiber optic sensors have been widely used for high temperature measurements. Distributed sensing schemes such as Rayleigh-scattering Optical Frequency Domain Reflectometry (OFDR) can perform distributed temperature sensing using unmodified single-mode optical fiber to achieve <1-cm spatial resolution. However, one of the key challenges of distributed sensing using Rayleigh backscattering is the weak Rayleigh-backscattering intensity exhibited by conventional optical fibers. Such weak Rayleigh backscattering is hardly a surprise, given that telecommunications optical fibers are designed for low-losses, including low Rayleigh-scattering losses.

To address this challenge, several approaches have been attempted to increase Rayleigh scattering in single-mode fibers. The resulting enhanced Rayleigh scattering profiles result in larger scattering signals at the detector(s) and better spectral correlation quality between the measured high-temperature Rayleigh profile and the reference room-temperature Rayleigh profile. This in turn improves the fidelity of the distributed measurement as well as the useful range of temperatures over which the sensor-fiber can operate effectively. However, even though Rayleigh scattering enhancement may be used to effectively extend the operational temperature and longevity of stable measurements, in current enhancement approaches environmental effects will eventually overcome the stability of the measurement during extended periods of high-temperature operation (>700° C.); with the maximum stable operational temperature depending on the surrounding chemical environment. At the highest operating temperatures, the same fiber core structural non-uniformities that give rise to the intrinsic Rayleigh scattering undergo permanent changes that compromise the sensitivity and reliability of distributed measurements.

There is thus room for improvement in distributed fiber optic sensing for applications that require high temperature stability, particularly in harsh chemical environments.

SUMMARY OF THE INVENTION

In one embodiment, a method of making an optical fiber sensor device structured for distributed sensing is provided. The method includes generating a laser beam comprising a plurality of ultrafast pulses, and focusing the laser beam into a core of an optical fiber to form a nanograting structure within the core, wherein the nanograting structure includes a plurality of spaced nanograting elements each extending substantially parallel to a longitudinal axis of optical fiber.

In another embodiment, an optical fiber sensor device structured for distributed sensing is provided that includes an optical fiber having a longitudinal axis, a core, and a nanograting structure within the core, wherein the nanograting structure includes a plurality of spaced nanograting elements each extending substantially parallel to the longitudinal axis of the optical fiber.

In still another embodiment, a distributed sensing method is provided that includes transmitting an interrogating light through an optical fiber sensor device as just described above, receiving a Rayleigh scattering profile from the optical fiber sensor device in response to the interrogating light, and determining a plurality of spatially resolved measurements based on the Rayleigh scattering profile.

In yet another embodiment, a distributed sensing system is provided that includes a light source structured to generate an interrogating light, an optical fiber sensor device as just described above structured to receive the interrogating light, and an optical frequency domain reflectometry sensing system structured and configured to receive a Rayleigh scattering profile from the optical fiber sensor device in response to the interrogating light, and determine a plurality of spatially resolved measurements based on the Rayleigh scattering profile.

In still a further embodiment, an energy production system is provided that includes a reactor assembly, an optical fiber sensor device as just described above provided within the reactor assembly, a light source structured to generate an interrogating light, wherein the optical fiber sensor device is structured to receive the interrogating light, and an optical frequency domain reflectometry sensing system structured and configured to receive a Rayleigh scattering profile from the optical fiber sensor device in response to the interrogating light, and determine a plurality of spatially resolved measurements based on the Rayleigh scattering profile.

DETAILED DESCRIPTION OF EXEMPLARY EMBODIMENTS

As used herein, the singular form of "a" "an", and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs.

As used herein, "directly coupled" means that two elements are directly in contact with each other.

As used herein, the term "number" shall mean one or an integer greater than one (i.e., a plurality).

As used herein, the term "ultrafast pulse" shall mean an electromagnetic pulse whose time duration is on the order of one nanosecond or less.

As used herein, the term "ultrafast laser system" shall mean a laser system that generates and emits laser pulses that are ultrafast pulses.

As used herein, the term "femtosecond ultrafast pulse" shall mean an ultrafast pulse whose time duration is on the order of 500 femtoseconds or less.

As used herein, the term "femtosecond ultrafast laser system" shall mean an ultrafast laser system that generates and emits laser pulses that are femtosecond ultrafast pulses.

As used herein, the term "substantially parallel" shall mean exactly parallel or within ±10° of exactly parallel.

As used herein, the term "substantially perpendicular" shall mean exactly perpendicular or within ±10° of exactly perpendicular.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

The disclosed concept will now be described, for purposes of explanation, in connection with numerous specific details in order to provide a thorough understanding of the disclosed concept. It will be evident, however, that the disclosed concept can be practiced without these specific details without departing from the spirit and scope of this innovation.

As described in greater detail herein, the disclosed concept uses ultrafast (e.g., femtosecond) laser irradiation with sub-µJ laser pulses (e.g., 300-nJ laser pulses) to produce optical fiber sensor devices that have enhanced Rayleigh scattering profiles and that are stable at high (e.g., 400° C. and higher) temperatures.

The resultant enhanced optical fiber sensor devices can, in the exemplary embodiment, perform distributed temperature sensing with very small (e.g., 1 mm) spatial resolution at very high temperatures (e.g. 800° C.) in highly reactive fuel gas (e.g., hydrogen) streams. Using this powerful sensing tool, distributed temperature measurements may be performed in harsh environments such as, without limitation, an operating SOFC system. In particular, in certain exemplary embodiments, infoiniation gathered by the optical fiber sensor devices of the disclosed concept can be compared with simulation results to aid in SOFC system design, or used to perform in-vivo monitoring of an active cell, and ultimately improve the operational efficiency and longevity of SOFC systems (or other energy production systems).

Figure 1:
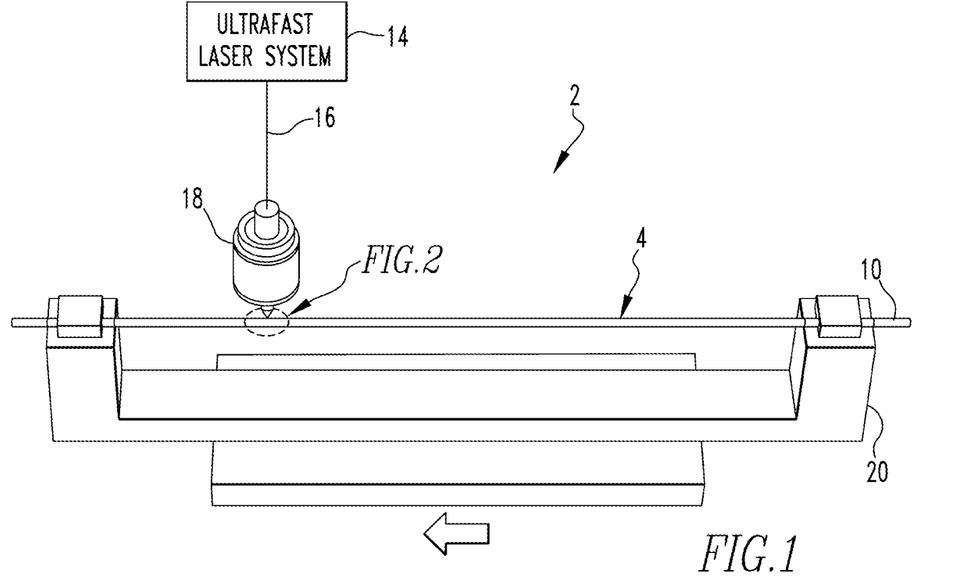
FIG. 1 is a schematic diagram of a system for manufacturing an optical fiber sensor device according to an exemplary embodiment of the disclosed concept.
Figure 2:
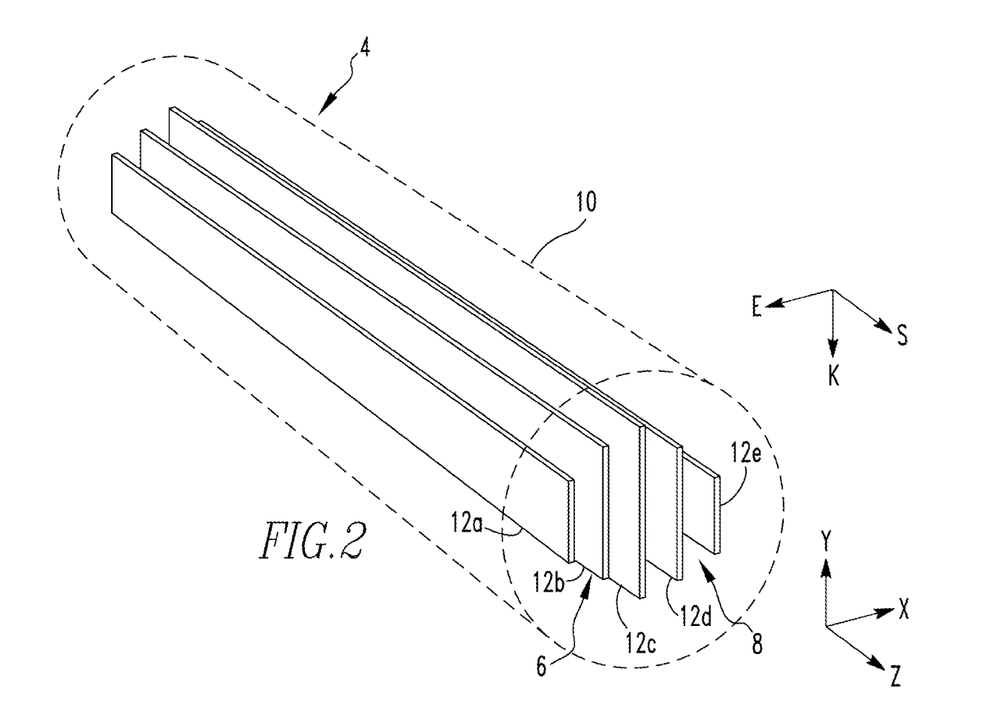
FIG. 2 is an enlarged view of a portion of the optical fiber sensor device manufactured using the system of FIG. 1 and the methodology described in detail herein.

FIG. 1 is a schematic diagram of a system 2 for manufacturing an optical fiber sensor device 4 according to an exemplary embodiment of the disclosed concept. FIG. 2 is an enlarged view of a portion of optical fiber sensor device 4 manufactured using the system 2 and the methodology described in detail herein. As described in greater detail herein, and as seen in FIG. 2, optical fiber sensor device 4 includes a nanograting structure 6 (described in detail below) that is provided in the core 8 of an optical fiber 10 framing part of optical fiber sensor device 4. In the exemplary embodiment, optical fiber 10 is a silica-based optical fiber. However, it will be appreciated that other types of optical fibers, such as single-crystal optical fibers like a sapphire-based optical fibers other single-crystal optical fibers, may also be employed within the scope of the disclosed concept.

Nanograting structure 6 is the mechanism that enables optical fiber sensor device 4 of the disclosed concept to provide enhanced Rayleigh scattering profiles and to be stable at high temperatures. As seen in FIG. 2, nanograting structure 6 includes a plurality of nanograting elements 12, labeled 12a-12c. Each nanograting element 12 comprises a portion of core 8 that has been caused to have a different, lower refractive index than the surrounding portions of core 8 as a result of the laser irradiation (and the damage caused thereby) that is described herein. For example, each nanograting element 12 may have a refractive index that ranges from the core index down to 90% of the refractive index of core 8. Other refractive index contrasts may also be achievable. Furthermore, each nanograting element 12 is generally planar and has a length that extends in the z direction of FIG. 2 along (i.e., substantially parallel to) the longitudinal axis of optical fiber 10. In addition, each nanograting element 12 has a width that extends in the x direction of FIG. 2 (substantially perpendicular to the longitudinal axis) and a height that extends in the y direction of FIG. 2 (also substantially perpendicular to the longitudinal axis). Also, as seen in FIG. 2, regions of substantially parallel reduced index or "nanograting elements 12" are spaced from one another in the x direction as determined by the ultrafast laser wavelength.

In one particular, non-limiting exemplary embodiment, the spacing between each pair of immediately adjacent nanograting elements 12 is significantly smaller than (in one particular embodiment less than or equal to one-fifth of) the wavelength of the interrogating light that is to be used to interrogate optical fiber sensor device 4 when in use. In another particular, non-limiting exemplary embodiment, the spacing between each pair of immediately adjacent nanograting elements 12 is less than or equal to one-tenth of the wavelength of the interrogating light that is to be used to interrogate optical fiber sensor device 4 when in use. These embodiments are produced via alteration of the ultrafast laser wavelength. These embodiments will reduce the likelihood that interrogation wavelength dependent loss features will be present during use.

Furthermore, in another particular, non-limiting exemplary embodiment, the spacing between each immediately adjacent pair of nanograting elements 12 is 750 nm or less, or, alternatively, 500 nm or less or 250 nm or less. In any case, the height and width of nanograting elements 12 depends on the laser energy deposited into the focal volume, which is also determined by the laser scanning speed.

Referring again to FIG. 1, the method by which nanograting structure 6 is formed in core 8 of optical fiber 10 using system 2 will now be described. As seen in FIG. 1, system 2 includes an ultrafast laser system 14 that is structured and configured to generate a laser beam 16 comprising a plurality of ultrafast pulses, and a pair of cylindrical lenses 18 that are structured to spatially shape and focus laser beam 16 into core 8 of optical fiber 10 (possibly through a focusing objective). System 2 also includes a computer controlled, air-bearing motion stage 20 that is structured to hold and support optical fiber 10 and move optical fiber 10 longitudinally relative to cylindrical lenses 18 and laser beam 16 in the direction shown by the arrow in FIG. 1. In operation, laser beam 16 is focused into core 8 as just described while optical fiber 10 is moved longitudinally relative to laser beam 16 by motion stage 20. This laser irradiation, consisting of a continuous pulse-train of ultrafast pulses, causes nanograting 6 to be produced within core 8 as shown and described in connection with FIG. 2. More specifically, as a result of the shaping and focusing of laser beam 16 by cylindrical lenses 18, the laser irradiation will have an intensity profile that causes nanograting elements 12 to be formed in core 8 of optical fiber 10, thereby forming optical fiber sensor device 4. Referring to FIG. 2, S is the scanning/translation direction of laser beam 16 during the method just described, E is the direction of the electrical field, and k is the nanograting orientation direction and the direction of writing light propagation of laser beam 16 during the method just described.

While in the embodiment just described optical fiber 10 is moved relative to a stationary laser beam 16, it will be appreciated that instead the laser beam may be moved relative to a stationary optical fiber 10 without departing from the scoped the disclosed concept.

In addition, in the embodiment just described, optical fiber 10 is a cylindrical fiber having a cylindrical core 8 and cylindrical cladding surrounding core 8. Alternatively, optical fiber 10 may be a so called D-shaped fiber or a so-called solid-core photonic bandgap fiber.

Moreover, in one non-limiting exemplary embodiment, ultrafast laser system 14 is a Coherent femtosecond ultrafast laser system that consists of a Coherent MIRA-D Ti:sapphire seed oscillator and a RegA 9000 regenerative amplifier operated at 800 nm with a repetition rate of 250 kHz. In this exemplary implementation, the pulse width of laser beam 16 is 300-fs. Also in this exemplary embodiment, the output of cylindrical lenses 18 is focused using an 80× microscope objective.

Figure 3A:
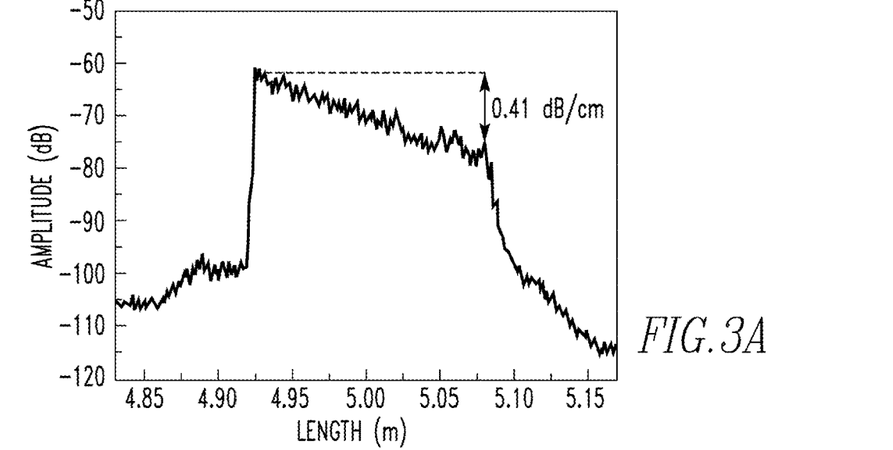
FIGS. 3A, 3B and 3C show the enhanced Rayleigh backscattering profiles of three exemplary optical fiber sensor devices made using the ultrafast laser direct writing scheme of the disclosed concept.
Figure 3B:
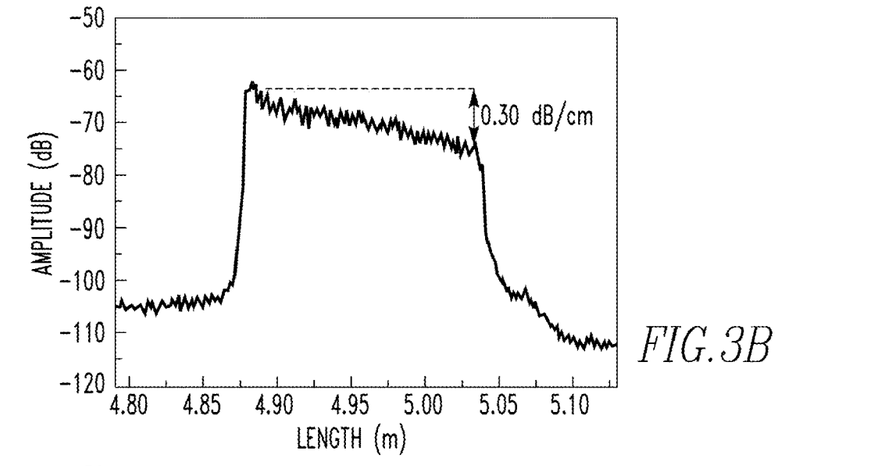
Figure 3C:
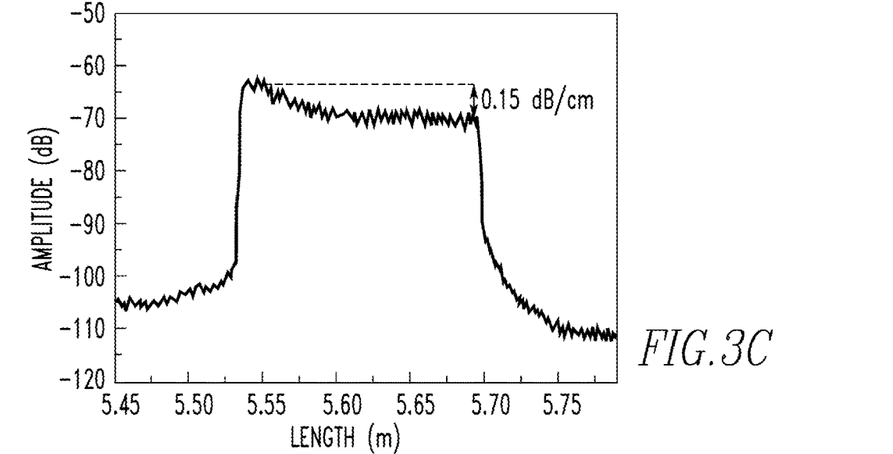

In addition, the exemplary system 2 as just described was used by the present inventors to create a number of exemplary optical fiber sensor devices 4 in 20 cm long sections of a silica based optical fiber 10 that was translated over 20 cm by motion stage 20 by varying the translation speed of motion stage 20 from 0.1 mm/s to 1 minis Specifically, scanning speeds of 0.1 mm/s, 0.5 mm/s, and 1 mm/s were used to create three exemplary optical fiber sensor devices 4. FIGS. 3A, 3B and 3C show the enhanced Rayleigh backscattering profiles of the three exemplary optical fiber sensor devices 4 using the ultrafast laser direct writing scheme of the disclosed concept (FIG. 3A shows the 0.1 mms example, FIG. 3B shows the 0.5 mm/s example, and FIG. 3C shows the 1 mm/s example). In each case, the on-target pulse energy was set at 300-nJ, which was determined to be slightly above the threshold pulse energy required to enhance the Rayleigh backscattering in the fused-silica fiber. As seen in FIGS. 3a-3c, an increase in the Rayleigh backscattering amplitude of 40-45 dB was obtained with laser irradiation for all of the chosen writing speeds. The ultrafast laser irradiation did not yield Rayleigh scattering enhancements when the laser writing speed exceeded 2 mm/s. The laser irradiation also introduced significant optical propagation losses in the irradiated fiber-samples, which is characterized by the slope of the Rayleigh-enhanced region. At 300-nJ pulse energy, the average propagation losses in the irradiation sections are 0.41 dB/cm, 0.30 dB/cm and 0.15 dB/cm, respectively. Therefore, in the exemplary implementation just described, a scanning speed of 1 mm/s was the optimal processing condition that minimized the insertion loss of the irradiated sensor-segment.

Figure 5:
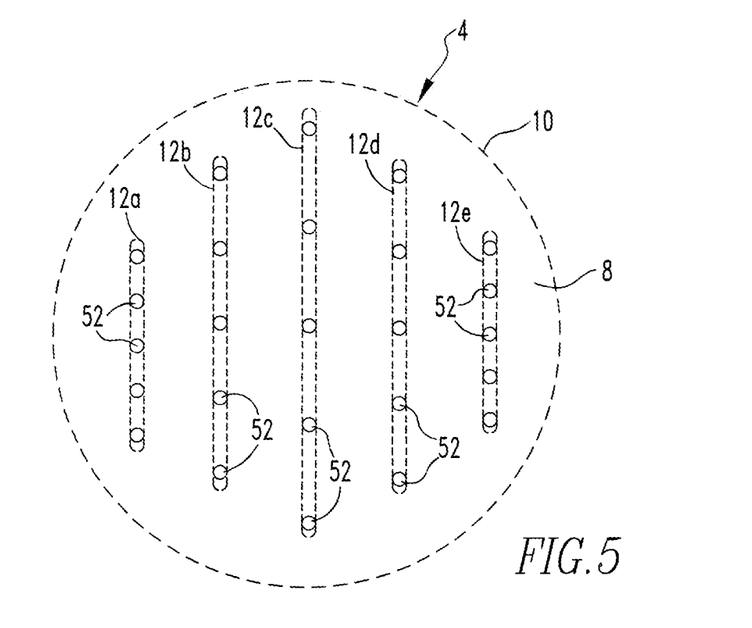
FIG. 5 is a schematic of a cross-section taken a long the z direction shown in FIG. 2 according to an exemplary embodiment.

According to a further aspect of the disclosed concept, optical fiber sensor device 4 as described herein may be subjected to an annealing process in order to further increase the stability thereof. In particular, in the exemplary embodiment, optical fiber sensor device or is annealed in a tube furnace during a process wherein the temperature of the furnace is ramped up from room temperature to a very high temperature, such as 800° C., in air and held at that temperature for a predetermined period of time, such as 4 hours. Thereafter, the optical fiber sensor device 4 is subjected to a reactive gas mixture, such as a gas mixture including hydrogen (e.g. 10% hydrogen), at the high temperature. In this embodiment, the high temperature annealing in the presence of a reactive gas causes a plurality of voids or nanopores 52 (e.g., spherical voids) to be formed in the core 8 of optical fiber 10 as shown in FIG. 5, which is a schematic of a cross-section taken a long the z direction shown in FIG. 2. In one embodiment, each of the voids 52 has a diameter on the order of 50 nm or less. As seen in FIG. 5, in the exemplary embodiment, voids 52 are at least partially provided within each of the nanograting elements 12 and are aligned anisotropically along the location of the nanograting elements 12. In the present embodiment, the annealing process causes the nanograting elements 12 to coalesce and form voids 52. The presence of voids 52 results in enhanced stability of the scattering. Furthermore, the regions that include voids 52 will demonstrate a larger index contrast as compared to the remainder of core 8. In one embodiment, the index contrast is on the order of 33% (i.e., the portion including voids 52 has an index of refraction that is 33% less than the index of refraction of core 8).

Another feature of optical fiber sensor device 4 is the fact that the backscattered amplitude will be different for the s and p polarizations of the backscattered signal. In other words, the backscattered amplitude of optical fiber sensor device 4 is polarization dependent. Such polarization dependence is caused by the anisotropy of nanograting elements 12. This feature can potentially be used for extracting additional value from nanograting elements 12, such as multi-parameter analysis due to the birefringence of the structures.

Figure 4:
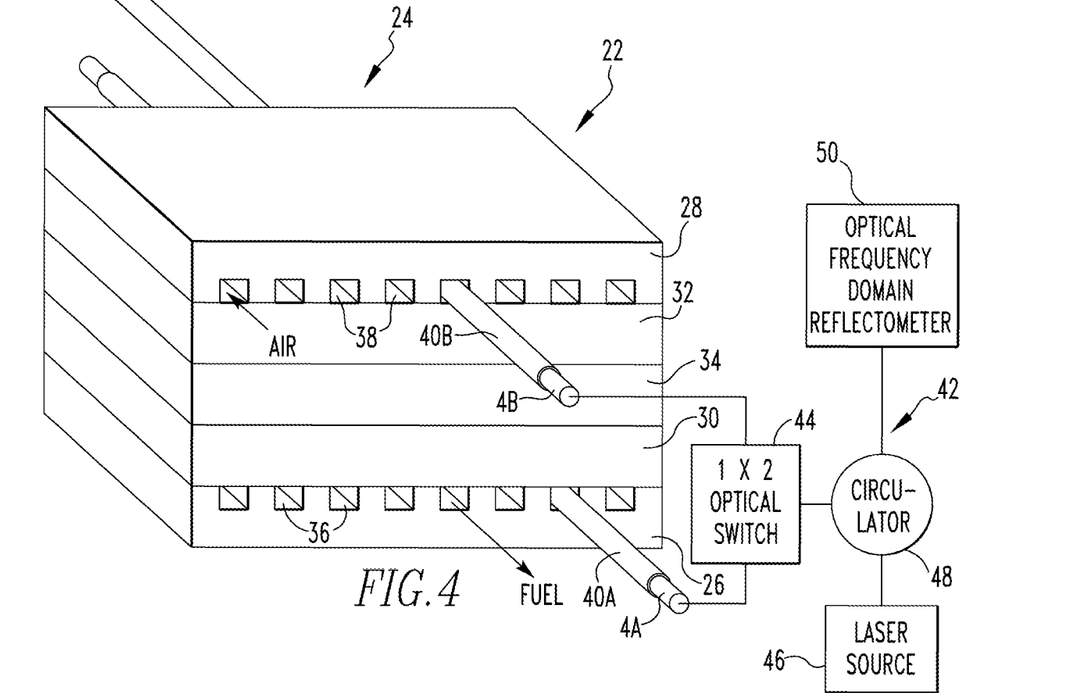
FIG. 4 is a schematic diagram of an SOFC system having distributed sensing capabilities according to one particular exemplary embodiment of the disclosed concept.

As noted elsewhere herein, optical fiber sensor device 4 of the disclosed concept may be used to perform distributed sensing (e.g., distributed temperature sensing) in harsh, high temperature environments such as those employed in various energy production processes from biomass reactors, to SOFC systems to nuclear reactors, among others. FIG. 4 is thus a schematic diagram of an SOFC system 22 having distributed sensing capabilities according to one particular exemplary embodiment of the disclosed concept which illustrates the usefulness of optical sensor device 4 as described herein in this regard.

Referring to FIG. 4, SOFC system 22 includes an SOFC assembly 24 that includes a first conductive interconnect 26, a second conductive interconnect 28, an anode layer 30, a cathode layer 32, and an electrolyte layer 34. In operation, a fuel stream (such as $H_2$ gas) is provided through SOFC assembly 24 under anode layer 30 in a first direction via passageways 36 provided in first conductive interconnect 26, and an air stream is provided through SOFC assembly 24 over cathode layer 32 in a second direction via passageways 38 provided in second conductive interconnect 28 as shown in FIG. 4. The exemplary SOFC assembly 24 shown in FIG. 4 is a "counter-flow" configuration, meaning the paths of the fuel stream and the air stream are in opposite directions. It will be understood that this is meant to be exemplary only and that other types of SOFC assemblies are known and are contemplated within the scope of the disclosed concept. In the cathode layer 32, oxygen in the air stream is reduced into oxygen ions. Those ions then diffuse through electrolyte layer 34 to anode layer 30, where they electrochemically oxidize the fuel in the fuel stream. In this reaction, a water byproduct is given off as well as electrons. Those electrons then flow through an external circuit to produce electrical current.

As seen in FIG. 4, SOFC system 22 further includes a first optical fiber sensor device 4 (labelled 4A) that is inserted through one of the passageways 36 within a nickel tube 40 (labelled 40A) for purposes of performing distributed temperature sensing with spatial resolution as described herein within SOFC assembly 24 between anode layer 30 and first conductive interconnect 26. Similarly, SOFC system 22 further includes a second optical fiber sensor device 4 (labelled 4B) that is inserted through one of the passageways 38 within a nickel tube 40 (labelled 40B) for purposes of performing distributed temperature sensing with spatial resolution as described herein within SOFC assembly 24 between cathode layer 32 and second conductive interconnect 28. First optical fiber sensor device 4A and second optical fiber sensor device 4B are both selectively coupled to an OFDR sensing system 42 through an optical swatch 44. In the illustrated embodiment, OFDR sensing system 42 includes a laser source 46, a circulator 48, and an optical frequency domain reflectometer 50 that is structured and configured to make distributed temperature sensing measurements based on the enhanced Rayleigh backscatter profiles that are generated by first optical fiber sensor device 4A and second optical fiber sensor device 4B (in response to an integrating laser light) using known or hereafter developed Rayleigh backscatter sensing techniques.

Accordingly, by employing ultrafast (e.g., femtosecond) laser irradiation with sub-µJ pulses, the Rayleigh scattering profile from commercially available silica fibers can be enhanced by more than 50-dB through nanograting formations in the fiber core. This increases the available measurable intensity at the optical detectors of an OFDR system, leading to significant improvements in both the Signal to noise ratio (SNR) and spectral shift quality of an OFDR-based measurement. The new Rayleigh backscatter features induced by the laser irradiation technique of the disclosed concept are stable at high temperatures, which enables reliable temperature measurements in extreme environments. This technique therefore represents a powerful new tool to potentially study a wide range of energy production processes from biomass reactors, to solid oxide fuel cells, to monitoring in nuclear reactors. Using the distributed sensing tool of the disclosed concept, reliable temperature measurements can be achieved from room temperature to 800° C. or higher. The disclosed concept may thus be used to probe an operating SOFC's temperature dependence on fuel stream inlet chemistry and fuel utilization that was previously inaccessible using known techniques. The capability for in-situ temperature monitoring with high spatial resolution within operational energy conversion devices such as solid oxide fuel cells represents a significant opportunity for process efficiency and long-term stability, which are two key metrics required for enabling widespread deployment of SOFCs in the power generation sector. The system described herein may also be useful for measurements in existing harsh-environment energy systems including combustion systems, boilers, and gas turbines. Other spatially resolved measurements, such as, without limitation, spatially resolved strain measurements or spatially resolved chemical composition measurements, are also possible within the scope of the disclosed concept.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed:

1. A method of making an optical fiber sensor device structured for distributed sensing, comprising:
   generating a laser beam comprising a plurality of ultrafast pulses; and
   focusing the laser beam into a core of an optical fiber to form a nanograting structure within the core, wherein the nanograting structure includes a plurality of spaced nanograting elements each extending substantially parallel to a longitudinal axis of optical fiber, wherein the nanograting elements each extend in a first direction that is substantially parallel to the longitudinal axis of the optical fiber, wherein the nanograting elements are spaced in a periodic manner from one another and aligned and positioned immediately adjacent one another in a second direction that is substantially perpendicular to the first direction, and wherein there is no spacing between or within any of the nanograting elements in the first direction such that the core does not include any grating elements therein spaced from one another in the first direction.

2. The method according to claim 1, wherein the plurality of ultrafast pulses comprises a plurality of femtosecond ultrafast pulses.

3. The method according to claim 2, wherein each of the femtosecond ultrafast pulses is a sub-µJ laser pulse.

4. The method according to claim 1, further comprising causing the laser beam and the optical fiber to be moved relative to one another during focusing such that the nanograting structure is formed within a longitudinally extending portion of the core.

5. The method according to claim 4, wherein a position of the laser beam in a longitudinal direction is stationary and wherein the optical fiber is caused to move relative to the laser beam.

6. The method according to claim 4, wherein the optical fiber is stationary and wherein the laser beam is caused to move relative to the optical fiber.

7. The method according to claim 1, wherein a portion of the core surrounding the nanograting structure has a first refractive index and wherein each nanograting element has a second refractive index that is lower than the first refractive index.

8. The method according to claim 7, wherein the second refractive index is 99% to 90% of the first refractive index.

9. The method according to claim 1, wherein each nanograting element is generally planar and has a length that extends in the first direction, a width that extends in the second direction, and a height that extends in a third direction that is substantially perpendicular to the longitudinal axis of the optical fiber.

10. The method according to claim 9, wherein the optical fiber sensor device is designed for use with an interrogating light having a wavelength, and wherein a spacing between each pair of immediately adjacent nanograting elements is less than or equal to one-fifth of the wavelength of the interrogating light.

11. The method according to claim 9, wherein the optical fiber sensor device is designed for use with an interrogating light having a wavelength, and wherein a spacing between each pair of immediately adjacent nanograting elements is less than or equal to one-tenth of the wavelength of the interrogating light.

12. The method according to claim 9, wherein a spacing between each immediately adjacent pair of nanograting elements is 750 nm or less.

13. The method according to claim 1, wherein the optical fiber is a single-crystal optical fiber.

14. The method according to claim 13, wherein the optical fiber is a sapphire: optical fiber.

15. The method according to claim 1, further comprising annealing the optical fiber sensor device after the formation of the nanograting structure in the presence of a reactive gas.

16. The method according to claim 15, wherein the reactive gas is hydrogen.

17. The method according to claim 15, wherein the annealing is performed at a temperature that is greater than or equal to 700° C.

18. The method according to claim 17, wherein the annealing is performed at a temperature that is greater than or equal to 800° C.

19. The method according to claim 15, wherein the annealing causes a plurality of voids to be formed within the core.

20. The method according to claim 15, wherein the annealing causes a plurality of voids to be formed at least partially within each of the nanograting elements.

21. The method according to claim 20, wherein each of the voids is spherical.

* * * * *

UNITED STATES PATENT AND TRADEMARK OFFICE
CERTIFICATE OF CORRECTION

| | |
|---|---|
| PATENT NO. | : 11,467,338 B2 |
| APPLICATION NO. | : 16/807232 |
| DATED | : October 11, 2022 |
| INVENTOR(S) | : Peng Kevin Chen et al. |

It is certified that error appears in the above-identified patent and that said Letters Patent is hereby corrected as shown below:

In the Claims

Column 10, Line 44, "sapphire: optical fiber" should read --sapphire optical fiber--

Signed and Sealed this
Twentieth Day of December, 2022

Katherine Kelly Vidal
*Director of the United States Patent and Trademark Office*